Figure 1:
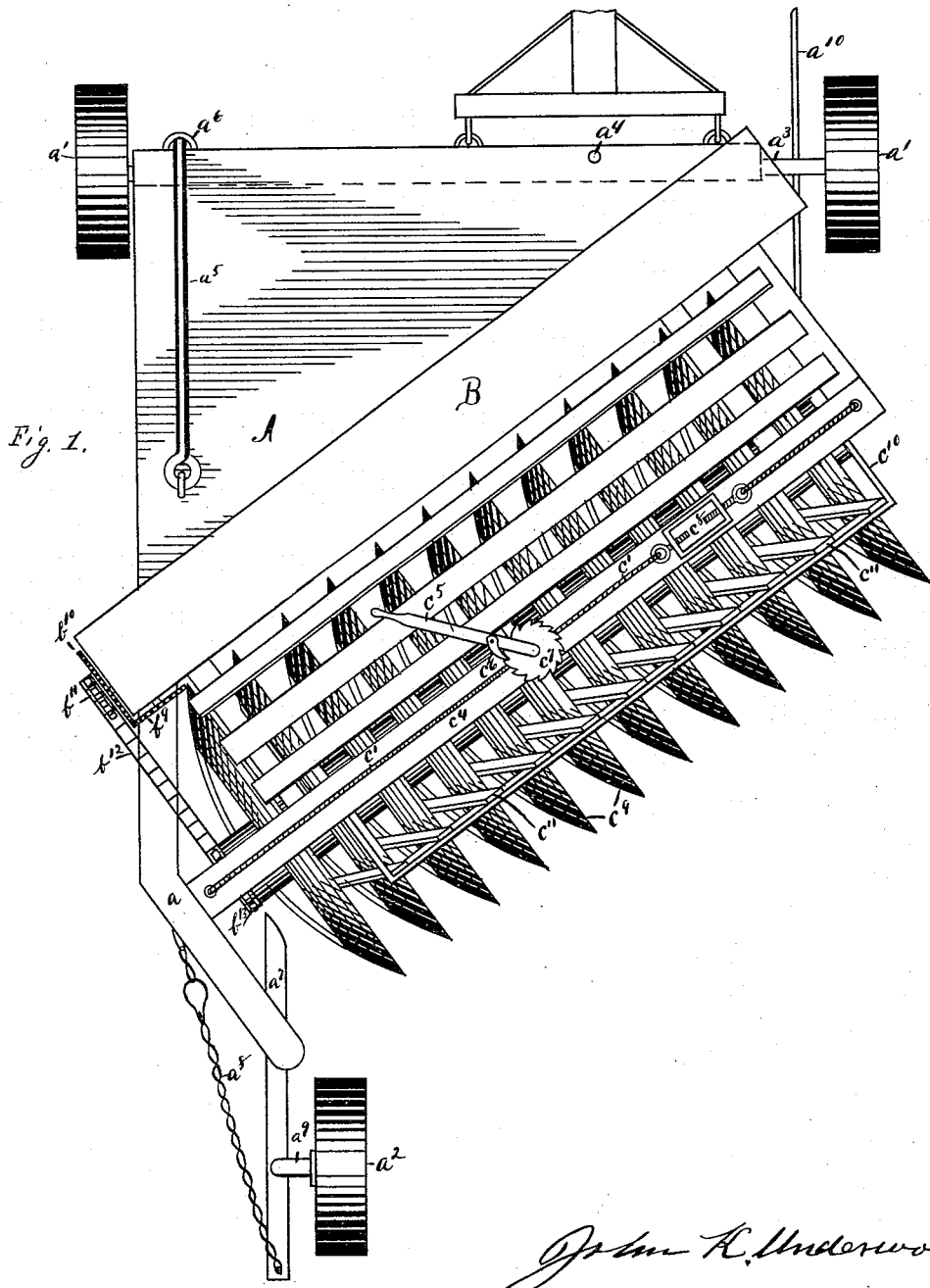

(No Model.)

2 Sheets—Sheet 1.

J. K. UNDERWOOD.
SEED PLANTER.

No. 461,153.

Patented Oct. 13, 1891.

Witnesses
A. E. Glascock
M. E. Lansdale

John K. Underwood
Inventor
By John S. Duffie
His Attorney (No Model.) 2 Sheets—Sheet 2.
J. K. UNDERWOOD.
SEED PLANTER.
No. 461,153. Patented Oct. 13, 1891.
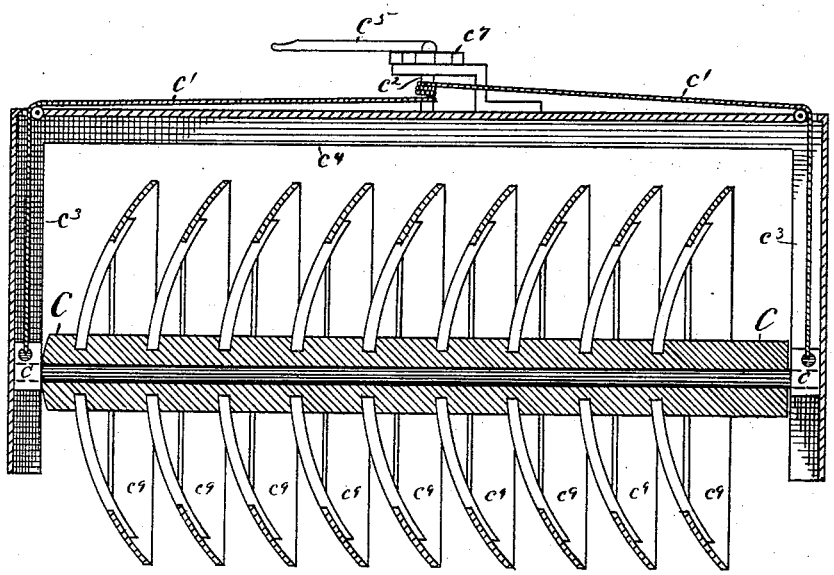
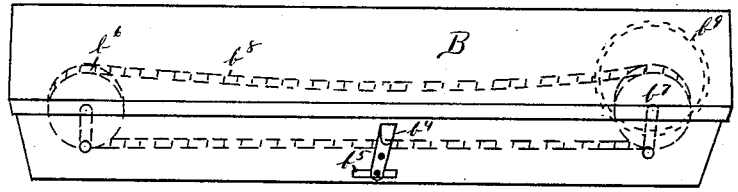
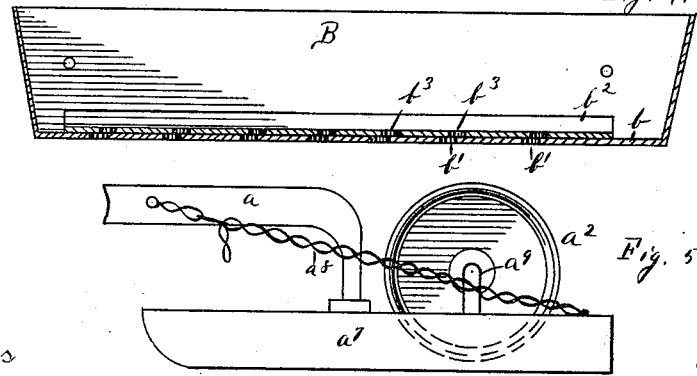
Witnesses
A. E. Glascock
M. E. Lansdale
Inventor
John K. Underwood
By John S. Duffie
His Attorney

UNITED STATES PATENT OFFICE.

JOHN KINEY UNDERWOOD, OF LA MOURE, NORTH DAKOTA, ASSIGNOR OF ONE-HALF TO JAMES W. STODDARD.

SEED-PLANTER.

SPECIFICATION forming part of Letters Patent No. 461,153, dated October 13, 1891.

Application filed June 24, 1891. Serial No. 397,359. (No model.)

*To all whom it may concern:*

Be it known that I, JOHN KINEY UNDERWOOD, a citizen of the United States, residing at La Moure, in the county of La Moure and State of North Dakota, have invented certain new and useful Improvements in Seed-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to revolving-disk seed-planters; and it consists in the novel construction and arrangement of its parts.

In the accompanying drawings, Figure 1 is a top elevation of my invention. Fig. 2 is a detail sectional view of the revolving disks and the frame which supports them. Fig. 3 is a perspective view of the hopper, showing the manner in which the distributing-chain works. Fig. 4 is a sectional view of the hopper, showing how the seed is allowed to flow out. Fig. 5 is a detail side view of the rear arm $a$ and its attachments.

My invention is described as follows: It consists of a platform A, having the rearwardly-extending arm $a$. This platform is mounted on three small truck-wheels $a'$ $a'$ and $a^2$. The forward trucks are journaled on an ordinary axle $a^3$, with the king-bolt $a^4$ at the right of the center of the platform for the purpose of bringing the line of draft in the center of the cylinder of revolving disks.

On the platform A is secured a hook $a^5$, which extends down and enters the eye $a^6$ on axle $a^3$, thus holding said axle in a stationary position when the seeder is passing down a row. When the end of a row is reached, the hook $a^5$ is removed from the eye $a^6$, and the seeder can be turned around in its own length. The rear end of the arm $a$ is bent down, and to it is pivoted the landside $a^7$. Said landside is made of hardened steel, and is beveled at its front end to pass over obstructions. The rear end of said landside is connected to the arm $a$ by means of a chain $a^8$. Said landside has also the arm $a^9$, on which is journaled said rear wheel $a^2$, the lower edge of the landside being a trifle lower than the wheel, so that it will enter the ground. On the axle $a^3$, near the wheel $a'$ on the right, is a similar landside $a^{10}$.

Along the rear side of the platform A is secured a hopper B, having the bottom $b$, (see Fig. 4,) provided with the perforations $b'$, and secured in said hopper is a sliding board $b^2$, having the perforations $b^3$, corresponding with the perforations $b^2$. By means of said sliding board the flow of the seed is regulated. The sliding board $b^2$ is operated by a lever $b^4$, pivoted to the front side of said hopper and connecting with said sliding board $b^2$ through the slot $b^5$. Said hopper has journaled in it the two wheels $b^6$ $b^7$, which carry an endless belt or chain $b^8$. The wheel $b^6$ is loosely journaled on its axle, while the wheel $b^7$ is secured to its axle, which in turn is secured to the cog-wheel $b^9$ on the outside of the hopper. The cog-wheel $b^9$ meshes with the cog-wheel $b^{10}$, set at right angles to said cog-wheel $b^9$. Said cog-wheel $b^{10}$ is mounted on a shaft, which connects with the sprocket-wheel $b^{11}$, which is operated by the sprocket-chain $b^{12}$, which passes around a sprocket-wheel $b^{13}$, secured to the revolving shaft of the disk cylinder.

The shaft C, to which the disks are secured, is journaled in the boxes $c$ $c$, which are adapted to be drawn up and down in the hollow uprights $c^3$ $c^3$ by means of the cable $c'$. (See Fig. 2.) Said cable passes over the windlass $c^2$ on the top of the cross-piece $c^4$, connecting the two uprights, and is operated by the lever $c^5$. Said lever is held in the desired position by the pawl $c^6$ engaging the ratchets of the stationary wheel $c^7$. The cable may be lengthened or shortened by the turn-buckle $c^8$. (See Fig. 1.) The disks $c^9$ are secured to the shaft C, and extending down from the attachment $c^{10}$, secured to the cross-piece $c^4$, are the cleaners $c^{11}$, which keep the disks free from brush and like obstructions.

Having described my invention, what I claim as new, and desire to secure by Letters Patent, is—

1. A seed-planter consisting of the platform A, having the rearwardly-extending arm $a$, axle $a^3$, pivoted near the right-hand side of said platform, having the eye $a^6$ and landside $a^{10}$, hook $a^5$, securing the left-hand end of said axle, landside $a^7$, pivoted to the end of arm $a$ and having the arm $a^9$, chain $a^8$, connecting the rear end of said landside and arm $a$, hopper B, having the perforated bottom $b$ and perforated sliding board $b^2$, adapted to be operated by the lever $b^4$, wheels $b^6$ and $b^7$, carrying endless chain $b^8$, cog-wheels $b^9$ and $b^{10}$, sprocket-wheel $b^{11}$, and sprocket-chain $b^{12}$, shaft C, having the sprocket-wheel $b^{13}$ and disks $c^9$, movable boxes $c$, hollow uprights $c^3$, cross-piece $c^4$, cable $c'$, windlass $c^2$, and lever $c^5$, substantially as shown and described.

2. In a seed-planter, the platform A, axle $a^3$, having the eye $a^6$ and pivoted under said platform near its right-hand side, and hook $a^5$, secured to said platform and adapted to hold the left-hand end of said axle, substantially as shown and described.

In testimony whereof I affix my signature in presence of two witnesses.

JOHN KINEY UNDERWOOD.

Witnesses:
   J. W. STODDARD,
   M. C. STODDARD.